United States Patent
Zhao et al.

(10) Patent No.: US 10,375,404 B1
(45) Date of Patent: Aug. 6, 2019

(54) METHODS FOR RATE CONTROL IN AN MB (MACROBLOCK) LAYER AND APPARATUSES USING THE SAME

(71) Applicant: Shanghai Zhaoxin Semiconductor Co., Ltd., Shanghai (CN)

(72) Inventors: Yongtao Zhao, Shanghai (CN); Ruiyang Chen, Shanghai (CN); Wei Wang, Shanghai (CN)

(73) Assignee: SHANGHAI ZHAOXIN SEMICONDUCTOR CO., LTD., Shanghai (CN)

( * ) Notice: Subject to any disclaimer, the term of this patent is extended or adjusted under 35 U.S.C. 154(b) by 28 days.

(21) Appl. No.: 15/926,116

(22) Filed: Mar. 20, 2018

(30) Foreign Application Priority Data

Jan. 29, 2018 (CN) .......................... 2018 1 0082870

(51) Int. Cl.
  H04N 7/12 (2006.01)
  H04N 11/02 (2006.01)
  H04N 11/04 (2006.01)
  H04N 19/25 (2014.01)
  H04N 19/593 (2014.01)
  H04N 19/42 (2014.01)

(52) U.S. Cl.
  CPC .............. *H04N 19/25* (2014.11); *H04N 19/42* (2014.11); *H04N 19/593* (2014.11)

(58) Field of Classification Search
  USPC ..................................................... 375/240.03
  See application file for complete search history.

(56) References Cited

U.S. PATENT DOCUMENTS

| | | | | |
|---|---|---|---|---|
| 6,192,148 B1* | 2/2001 | Lin | ...................... | H04N 11/044 375/E7.166 |
| 2003/0072364 A1* | 4/2003 | Kim | ...................... | H04N 19/147 375/240.03 |
| 2006/0146932 A1* | 7/2006 | Panusopone | ........... | H04N 19/61 375/240.12 |
| 2006/0171456 A1* | 8/2006 | Kwon | .................. | H04N 19/197 375/240.03 |
| 2011/0090960 A1* | 4/2011 | Leontaris | ............. | H04N 19/103 375/240.12 |
| 2013/0022102 A1* | 1/2013 | Casula | ................ | H04N 19/176 375/240.02 |

* cited by examiner

*Primary Examiner* — Chikaodili E Anyikire
(74) *Attorney, Agent, or Firm* — McClure, Qualey & Rodack, LLP

(57) ABSTRACT

The invention introduces a method for rate control in an MB (macroblock) layer, including: calculating a prediction MAD (Mean Absolute Difference) of a current MB of a current frame according to a real MAD of a previous MB of a previous frame; calculating a real MAD of the current MB of the current frame; performing an adjustment procedure to adjust the prediction MAD of the current MB of the current frame according to the real MAD of the current MB of the current frame to obtain a final MAD of the current MB of the current frame; calculating a quantization parameter of the current MB of the current frame according to the final MAD of the current MB of the current frame; and outputting the quantization parameter of the current MB of the current frame to a quantizer.

20 Claims, 10 Drawing Sheets

METHODS FOR RATE CONTROL IN AN MB (MACROBLOCK) LAYER AND APPARATUSES USING THE SAME

CROSS REFERENCE TO RELATED APPLICATIONS

This Application claims priority of China Patent Application No. 201810082870.6, filed on Jan. 29, 2018, the entirety of which is incorporated by reference herein.

BACKGROUND

Technical Field

The present invention relates to video processing, and in particular to methods for rate control in an MB (macroblock) layer and apparatuses using the same.

Description of the Related Art

Rate control decides how many bits to spend for a given frame or MB (macroblock). The goal of video encoding is to save as many bits as possible, reducing the file size over the original input file, while retaining as much quality as possible. Rate control is a crucial step in determining that tradeoff between size and quality.

FIG. 1 is a block diagram illustrating a conventional video encoding system. The quantization parameter calculator 110 is installed before the intra-and-inter-mode predictor 130, the transformer 150 and the quantizer 170 to calculate a quantization parameter for each MB by using a rate control algorithm according to a MAD (mean absolute difference) and a stream budget. However, the calculation of the quantization parameter for the current MB only relies on a prediction MAD but does not take a real MAD into account. The rate control algorithm is affected by the inaccuracy and latency of the prediction MAD and cannot achieve its goal when complexity variances within a video sequence are high. Accordingly, what is needed are methods for rate control in an MB (macroblock) layer and apparatuses that use these methods.

BRIEF SUMMARY

An embodiment of the invention introduces a method for rate control in an MB (macroblock) layer, comprising: calculating a prediction MAD (Mean Absolute Difference) of a current MB of a current frame according to a real MAD of a previous MB of a previous frame; calculating a real MAD of the current MB of the current frame; performing an adjustment procedure to adjust the prediction MAD of the current MB of the current frame according to the real MAD of the current MB of the current frame to obtain a final MAD of the current MB of the current frame; calculating a quantization parameter of the current MB of the current frame according to the final MAD of the current MB of the current frame; and outputting the quantization parameter of the current MB of the current frame to a quantizer, thereby enabling the quantizer to generate a compressed video stream under a rate corresponding to the current MB of the current frame.

An embodiment of the invention introduces an apparatus for rate control in an MB layer, comprising: a quantizer; and a quantization parameter calculator coupled to the quantizer. The quantization parameter calculator calculates a prediction MAD of a current MB of a current frame according to a real MAD of a previous MB of a previous frame; calculates a real MAD of the current MB of the current frame; performs an adjustment procedure to adjust the prediction MAD of the current MB of the current frame according to the real MAD of the current MB of the current frame to obtain a final MAD of the current MB of the current frame; calculates a quantization parameter of the current MB of the current frame according to the final MAD of the current MB of the current frame; and outputs the quantization parameter of the current MB of the current frame to a quantizer, thereby enabling the quantizer to generate a compressed video stream under a rate corresponding to the current MB of the current frame.

The current MB and the previous MB are located at the same two-dimensional coordinates of the current frame and the previous frame, respectively. The real MAD of the previous MB of the previous frame reflects the variances between raw data and reconstructed data of the previous MB. The real MAD of the current MB of the current frame reflects the variances between raw data and reconstructed data of the current MB.

A detailed description is given in the following embodiments with reference to the accompanying drawings.

BRIEF DESCRIPTION OF THE DRAWINGS

The present invention can be fully understood by reading the subsequent detailed description and examples with references made to the accompanying drawings, wherein.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Figure 1:
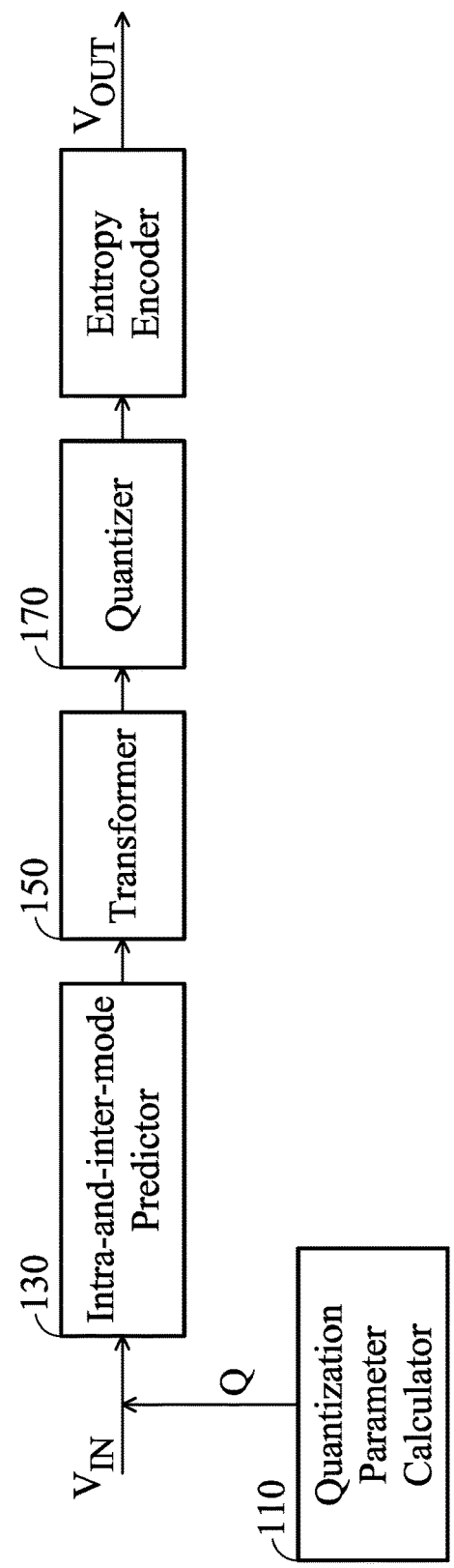
FIG. 1 is a block diagram illustrating a conventional video encoding system.
Figure 2:
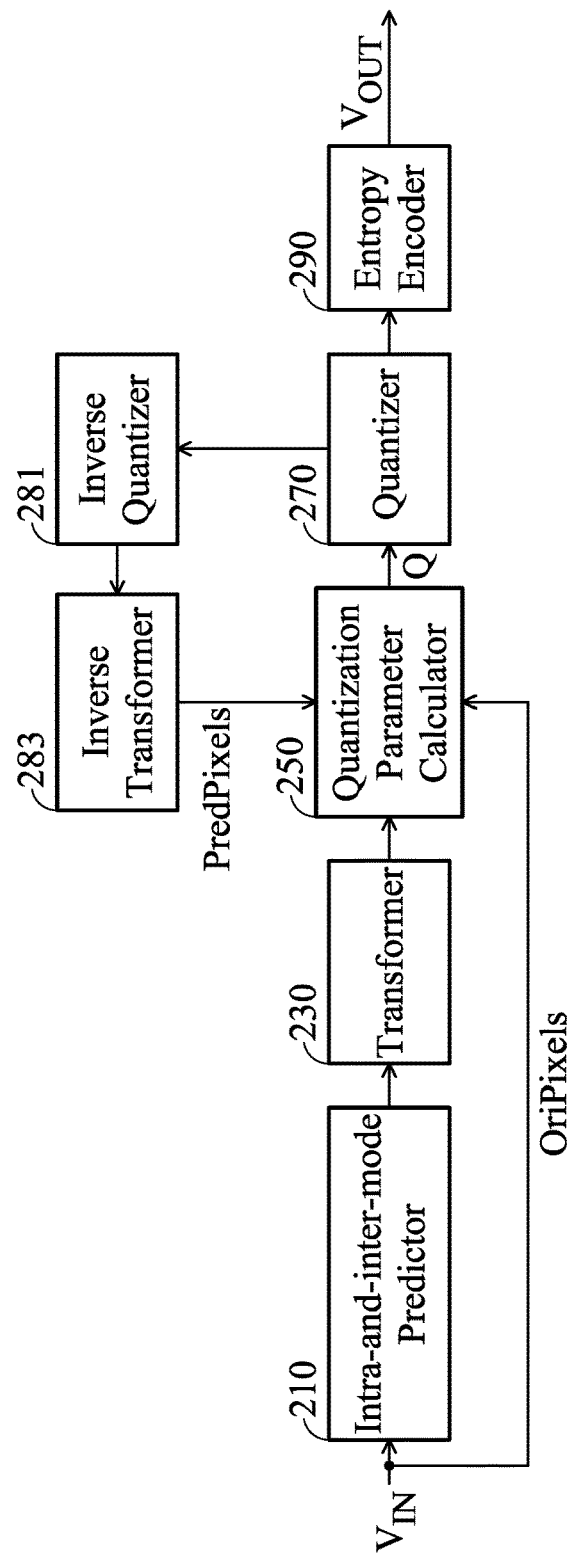
FIG. 2 is a block diagram of an apparatus for rate control in an MB (macroblock) layer according to an embodiment of the invention.

FIG. 2 is a block diagram of an apparatus for rate control in an MB (macroblock) layer according to an embodiment of the invention. An intra-and-inter-mode predictor 210 may adopt well-known rate-distortion optimization (RDO) technique, or other algorithms, to obtain the best intra- and inter-prediction for each MB, while maximizing visual quality and minimizing the required bit rate. The MB may be an 8×8, 8×16, 16×8, 16×16 block, or others. The intra-and-inter-mode predictor 210 may employ full search for both motion estimation and intra prediction. A transformer 230 may adopt well-known DCT (discrete cosine transform), wavelet transform technique, or other algorithms, to transform data of each MB from spatial domain to frequency domain. A quantization parameter calculator 250 may be implemented in numerous ways, such as with dedicated hardware (e.g. digital circuits) for practicing the following functions, or with general-purpose hardware (e.g., a single processor, multiple processors or graphics processing units capable of parallel computations, or others) that is programmed using instructions, macrocode or microcode to perform the functions recited herein. Or, the quantization parameter calculator 250 may be implemented in the combination of dedicated and general-purpose hardware. The processor may include an ALU (Arithmetic and Logic Unit) and a bit shifter. The ALU is responsible for performing Boolean calculations, such as AND, OR, NOT, NAND, NOR, XOR, XNOR or others, mathematic calculations, such as addition, subtraction, multiplication, division, or others, special functions, such as root, square, trigonometric functions, or others. The bit shifter is responsible for performing a bit shifting and a bit rotation. A quantizer 270 divides each MB output from the transformer 230 component-wise by a quantization matrix corresponding to the Qp, and rounds each resultant element. The quantization matrix is designed to provide more resolution to more perceivable frequency components over less perceivable components, for example, lower frequencies over high frequencies, so as to transform as many components to 0, which can be encoded with greatest efficiency. An entropy encoder 290 may compress each quantized MB output from the quantizer 270 by replacing each fixed-length input symbol of each quantized MB with the corresponding variable-length prefix-free output codeword. Commonly used entropy encoding algorithms may include Huffman coding, arithmetic coding and the like. An inverse quantizer 281 and an inverse transformer 283 perform inverse operations of the quantizer 270 and the transformer 230, respectively, to reconstruct each quantized MB output from the quantizer 270. For each MB, the quantization parameter calculator 250 takes not only prediction MAD (Mean Absolute Difference) but also a real MAD between the raw data and the reconstructed MB to obtain a quantization parameter more reflecting real situations, yielding better rate control. Detailed operations of the quantization parameter calculator 250 are described in the following paragraphs.

Figure 3:
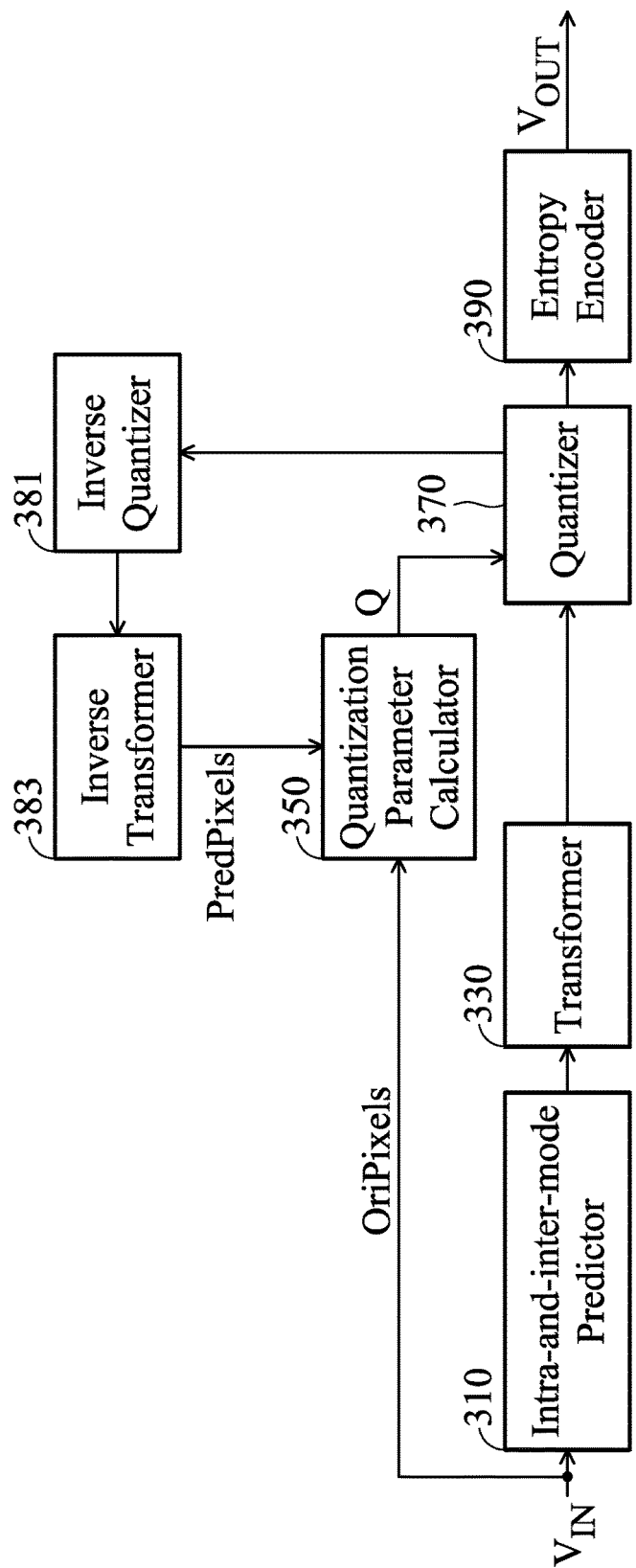
FIG. 3 is a block diagram of an apparatus for rate control in an MB layer according to an embodiment of the invention.

FIG. 3 is a block diagram of an apparatus for rate control in an MB layer according to an embodiment of the invention. An intra-and-inter-mode predictor 310, a transformer 330, a quantization parameter calculator 350, a quantizer 370, an inverse quantizer 381, an inverse transformer 383 and an entropy encoder 390 perform similar operations with that by the intra-and-inter-mode predictor 210, the transformer 230, the quantization parameter calculator 250, the quantizer 270, the inverse quantizer 281, the inverse transformer 283 and the entropy encoder 290, respectively. Thus, technical details are identical to the descriptions of FIG. 2 and are omitted here for brevity. Since the quantization parameter calculator 350 and the quantizer 370 can be performed independently, other than FIG. 2, the quantization parameter calculator 350 and the quantizer 370 are connected to the transformer 330 in parallel so as to improve computation efficiency.

Figure 4:
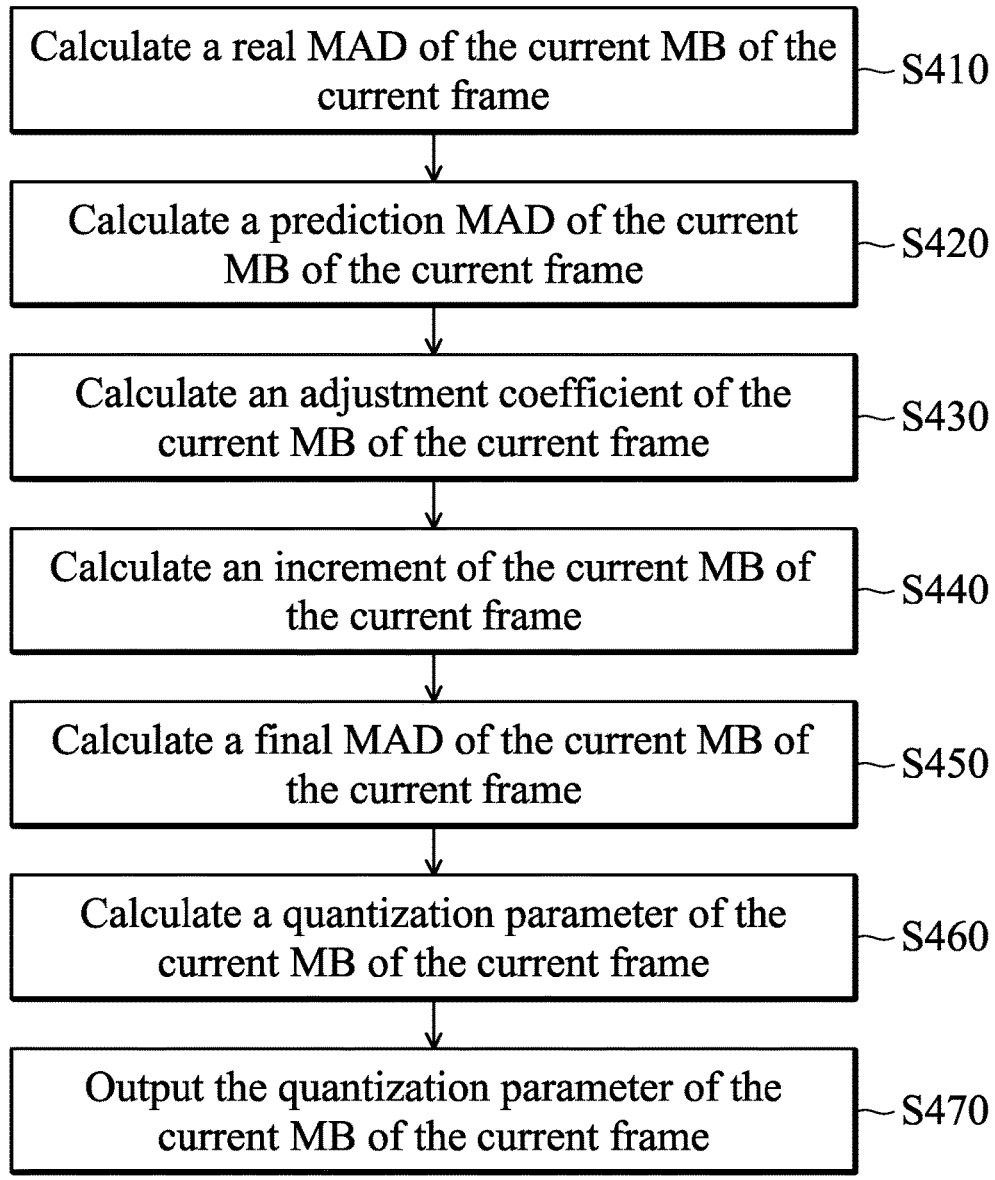
FIG. 4 is a flowchart illustrating a method for rate control in an MB layer according to an embodiment of the invention.

FIG. 4 is a flowchart illustrating a method for rate control in an MB layer according to an embodiment of the invention. The method may be implemented in the quantization parameter calculator 250 or 350 to provide the functionality described as follows.

Figure 6:
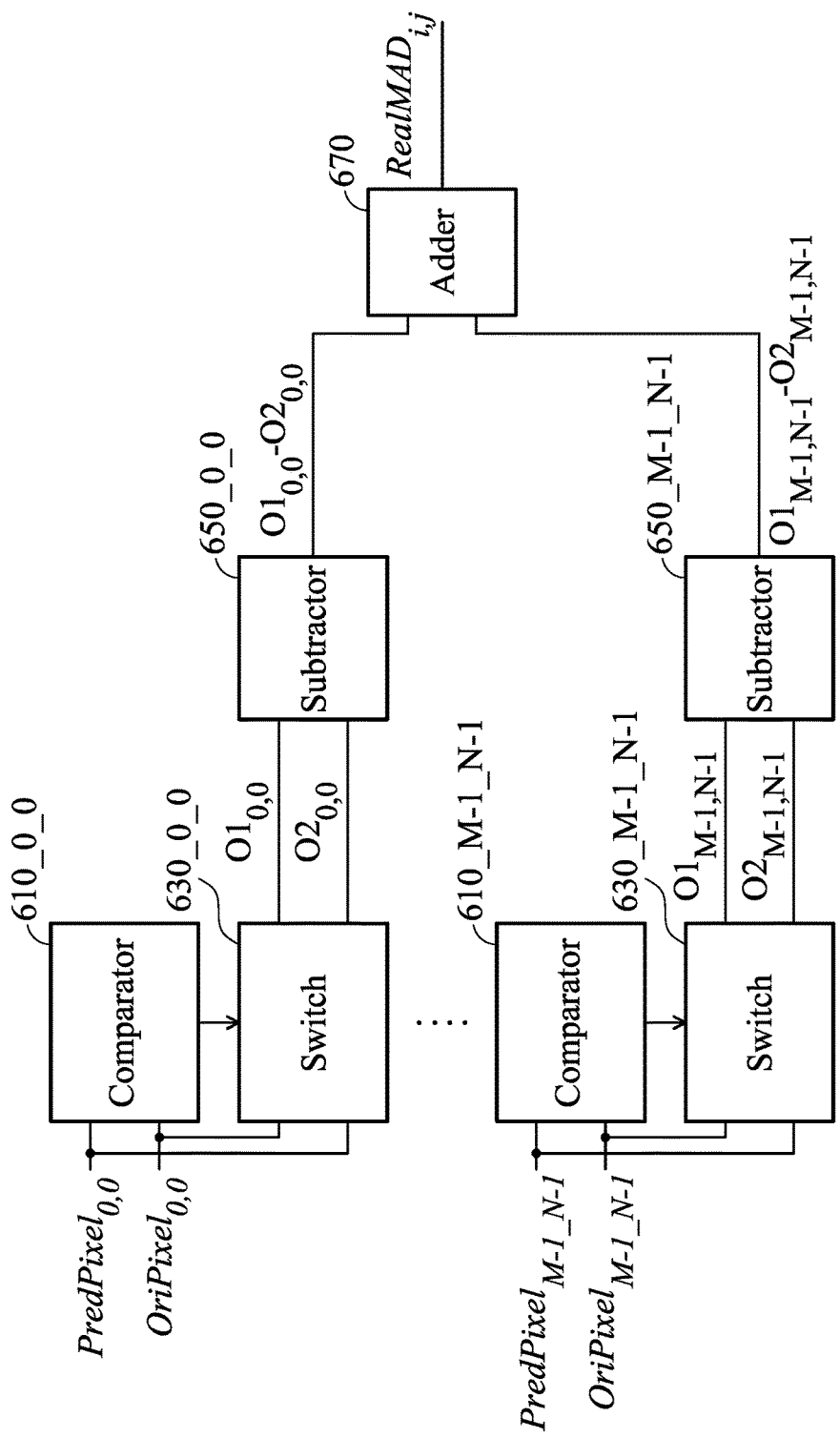
FIG. 6 is a schematic diagram illustrating hardware circuits for calculating a real MAD of the current MB of the current frame according to an embodiment of the invention.

First, a real MAD of an MB (referred to as the current MB hereinafter) of the current frame is calculated, which reflects the variances between raw data and reconstructed data of the current MB (step S410). Specifically, in step S410, the real MAD of the current MB of the current frame may be calculated using Equation (1):

$$RealMAD_{i,j} = \left(\sum_{m=0}^{M-1}\sum_{n=0}^{N-1} |CstPixel_{m,n} - OriPixel_{m,n}|\right) / (M \times N);$$

where $RealMAD_{i,j}$ represents the real MAD of the $j^{th}$ MB (the current MB) of the $i^{th}$ frame (the current frame), M represents the total number of rows of the current MB of the current frame, N represents the total number of columns of the current MB of the current frame, $PredPixel_{m,n}$ represents the prediction pixel of the $n^{th}$ column of the $m^{th}$ row of the $j^{th}$ MB of the $i^{th}$ frame obtained from the inverse transformer 283 or 383, and $OriPixel_{m,n}$ represents the raw pixel of the $n^{th}$ column of the $m^{th}$ row of the $j^{th}$ MB of the $i^{th}$ frame obtained from the video sequence $V_{IN}$. $RealMAD_{i,j}$ may be stored in a volatile memory, so that it can be used to calculate a quantization parameter for the next frame by the quantization parameter calculator 250 or 350. It should be noted that the conventional calculation of the quantization parameter does not take the factor of the real MAD into account. Therefore, the rate control algorithm is affected by the inaccuracy and latency of the prediction MAD when complexity variances within a video sequence are high. In some embodiments, Equation (1) may be implemented in instructions, macrocode or microcode, and calculated when a processor loads and executes the instructions, macrocode or microcode. In alternative embodiments, Equation (1) may be implemented in dedicated hardware circuits. FIG. 6 is a schematic diagram illustrating hardware circuits for calculating a real MAD of the current MB of the current frame according to an embodiment of the invention. For each pixel of the current MB, a comparator 610_$m$_$n$ obtains the raw pixel OriPixel$_{m,n}$ of the $n^{th}$ column of the $m^{th}$ row of the current MB of the current frame and the prediction pixel PredPixel$_{m,n}$ of the $n^{th}$ column of the $m^{th}$ row of the current MB of the current reconstructed frame and compares the raw pixel OriPixel$_{m,n}$ with the prediction pixel PredPixel$_{m,n}$, where m is an integer ranging from 0 to M−1 and n is an integer ranging from 0 to N−1. When OriPixel$_{m,n}$ equals or is greater than PredPixel$_{m,n}$, a comparator 610_$m$_$n$ directs a switch 630_$m$_$n$ to feed the raw pixel OriPixel$_{m,n}$ to the output terminal O1$_{m,n}$ and feed the prediction pixel PredPixel$_{m,n}$ to the output terminal O2$_{m,n}$. When OriPixel$_{m,n}$ is smaller than PredPixel$_{m,n}$, the comparator 610_$m$_$n$ directs the switch 630_$m$_$n$ to feed the raw pixel OriPixel$_{m,n}$ to the output terminal O2$_{m,n}$ and feed the prediction pixel PredPixel$_{m,n}$ to the output terminal O1$_{m,n}$. A subtractor 650_$m$_$n$ connects the output terminals O1$_{m,n}$ and O2$_{m,n}$ of the switch 630_$m$_$n$, subtracts the output of the output terminals O1$_{m,n}$ from the output of the output terminals O2$_{m,n}$ and outputs the result to the adder 670. An adder 670 sums up the outputs of the subtractor 650_0_0 to 650_M−1_N−1 to obtain the real MAD RealMAD$_{i,j}$ of the current MB of the current frame.

Figure 5:
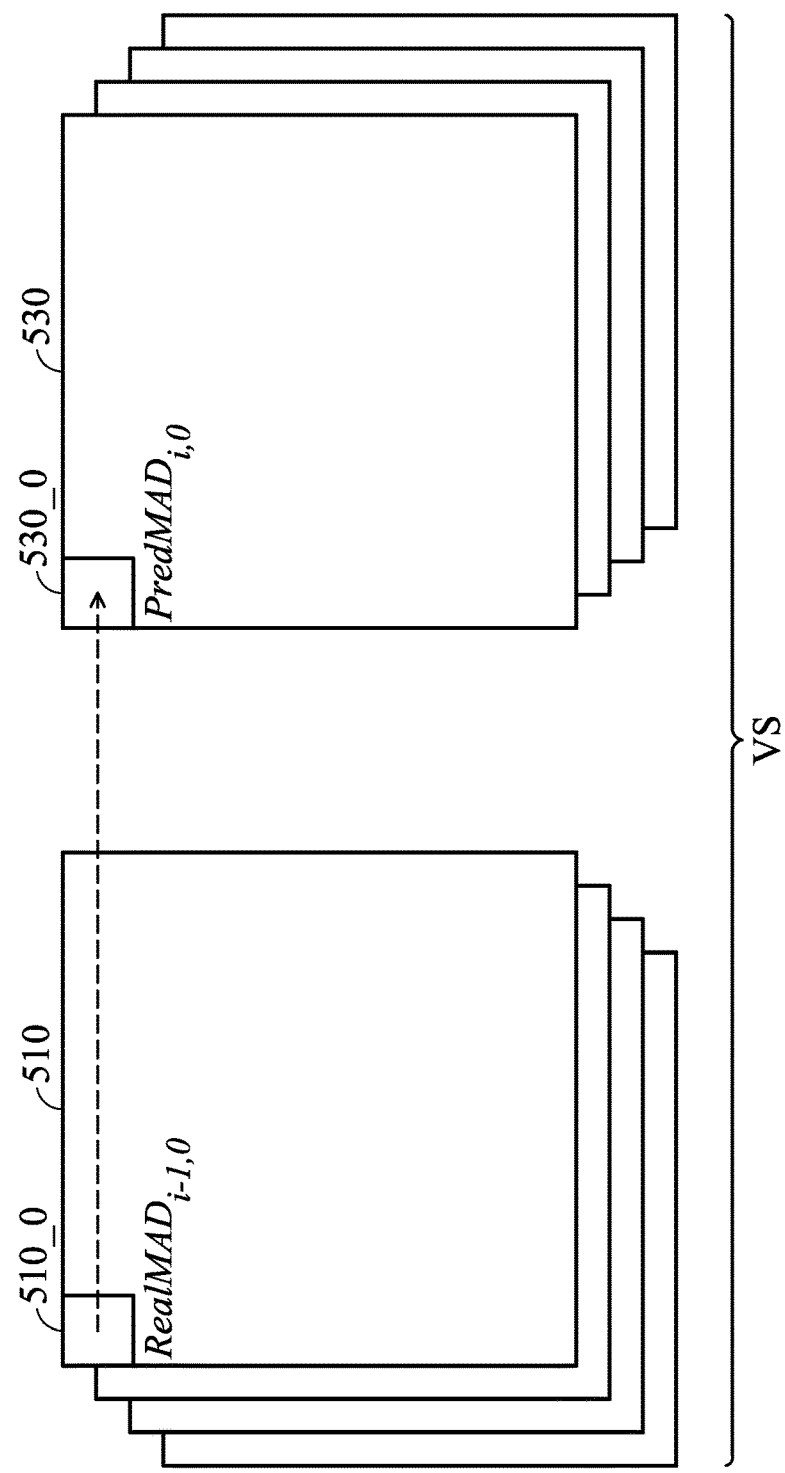
FIG. 5 is a schematic diagram illustrating an exemplary correspondence of the current MB to the previous MB according to an embodiment of the invention.
Figure 7:
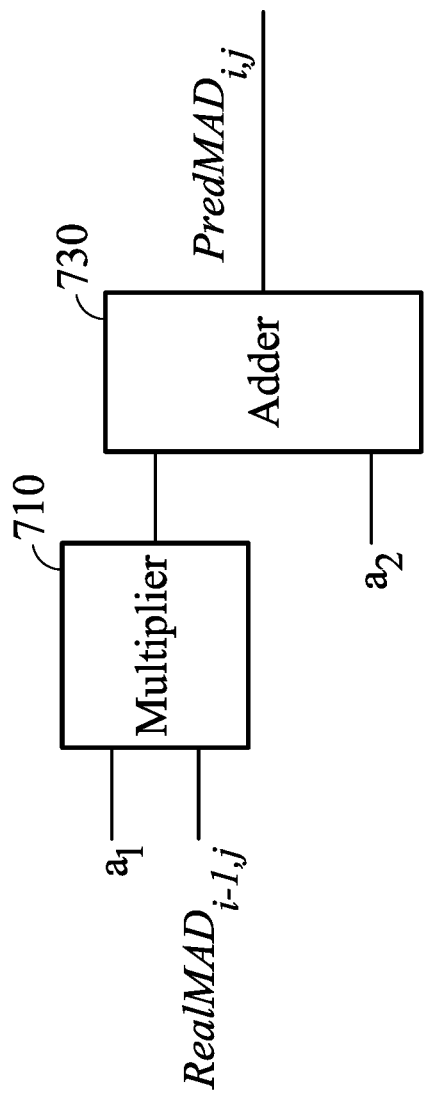
FIG. 7 is a schematic diagram illustrating hardware circuits for calculating a prediction MAD of the current MB of the current frame according to an embodiment of the invention.

Next, a prediction MAD of the current MB of the current frame is calculated according to the real MAD of corresponding MB (referred to as the previous MB) of the previous frame, where the current MB and the previous MB are located at the same two-dimensional coordinates of the current frame and the previous frame, respectively, and the real MAD of the previous MB of the previous frame reflects the variances between raw data and reconstructed data of the previous MB (step S420). FIG. 5 is a schematic diagram illustrating an exemplary correspondence of the current MB to the previous MB according to an embodiment of the invention. For example, a frame 510 (the previous frame) is the i−1$^{th}$ frame of a video sequence and a frame 530 (the current frame) is the i$^{th}$ frame of the video sequence. The MB 510_0 is the 0$^{th}$ MB (the previous MB) of the previous frame and the MB 530_0 is the 0$^{th}$ MB (the current MB) of the current frame. Step S420 calculates the prediction MAD PredMAD$_{i-1,0}$ of the current MB 530_0 of the current frame 530 at least according to the real MAD RealMAD$_{i-1,0}$ of the previous MB 510_0 of the previous frame 510. In step S420, the prediction MAD of the current MB of the current frame may be calculated using the linear prediction model shown in FIG. (2):

$$\text{PredMAD}_{i,j} = a_1 \times \text{RealMAD}_{i-1,j} + a_2;$$

where PredMAD$_{i,j}$ represents the prediction MAD of the j$^{th}$ MB (the current MB) of the i$^{th}$ frame (the current frame), RealMAD$_{i-1,j}$ represents the real MAD of the j$^{th}$ MB (the previous MB) of the i−1$^{th}$ frame (the previous frame), and a$_1$ and a$_2$ are parameters of the linear prediction model. The parameters a$_1$ and a$_2$ are fit by generalized least squares according to historical data, represent a slop and an intercept of the linear prediction model and may be stored in volatile or nonvolatile memory. In some embodiments, Equation (2) may be implemented in instructions, macrocode or microcode, and calculated when a processor loads and executes the instructions, macrocode or microcode. In alternative embodiments, Equation (2) may be implemented in dedicated hardware circuits. FIG. 7 is a schematic diagram illustrating hardware circuits for calculating a prediction MAD of the current MB of the current frame according to an embodiment of the invention. A multiplier 710 multiplies the parameter a$_1$ by the real MAD RealMAD$_{i,j}$ of the current MB of the current frame, and outputs the result to an adder 730. The adder 730 adds the parameter a$_2$ to the output of the multiplier 710 to obtain the prediction MAD PredMAD$_{i,j}$ of the current MB of the current frame.

Next, an adjustment coefficient of the current MB of the current frame is calculated according to the prediction and real MADs of the current MB of the current frame and the accumulated deltas of all MBs before the current MB of the current frame (step S430). In step S430, the adjustment coefficient of the current MB of the current frame may be calculated using Equation (3):

$$\alpha_{i,j} = 2^{-2 \times abs\left(\sum_{k=0}^{j-1} \text{Delta}_{i,k} + \text{RealMAD}_{i,j} - \text{PredMAD}_{i,j}\right)};$$

where $\alpha_{i,j}$ represents the adjustment coefficient of the j$^{th}$ MB (the current MB) of the i$^{th}$ frame (the current frame), $$\sum_{k=0}^{j-1} \text{Delta}_{i,k}$$

represents the accumulated deltas from the 0$^{th}$ MB to the j−1$^{th}$ MB of the i$^{th}$ frame (the current frame), PredMAD$_{i,j}$ represents the prediction MAD of the j$^{th}$ MB (the current MB) of the i$^{th}$ frame (the current frame) calculated in step S420, RealMAD$_{i,j}$ represents the real MAD of the j$^{th}$ MB (the current MB) of the i$^{th}$ frame (the current frame) calculated in step S410, and 0<$\alpha_{i,j}$≤1. In some embodiments, Equation (3) may be implemented in instructions, macrocode or microcode, and calculated when a processor loads and executes the instructions, macrocode or microcode.

Figure 8:
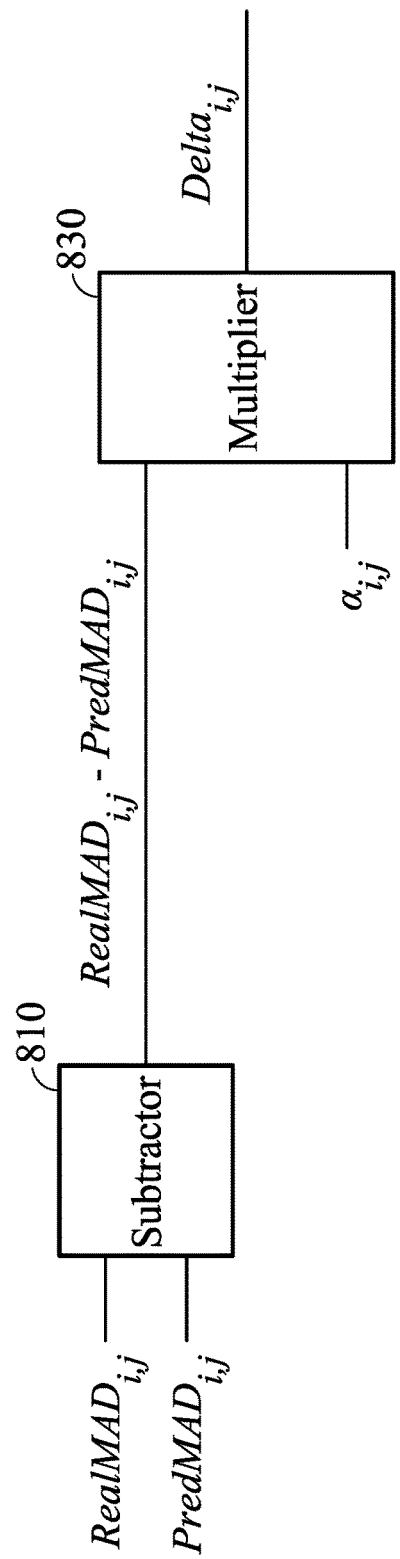
FIG. 8 is a schematic diagram illustrating hardware circuits for calculating an increment of the current MB of the current frame according to an embodiment of the invention.

Next, an increment of the current MB of the current frame is calculated according to the prediction MAD, the real MAD and the adjustment coefficient of the current MB of the current frame (step S440). In step S440, the increment of the current MB of the current frame may be calculated using Equation (4):

$$\text{Delta}_{i,j} = \alpha_{i,j} \times (\text{RealMAD}_{i,j} - \text{PredMAD}_{i,j});$$

where Delta$_{i,j}$ represents the increment of the j$^{th}$ MB (the current MB) of the i$^{th}$ frame (the current frame), $\alpha_{i,j}$ represents the adjustment coefficient of the j$^{th}$ MB of the i$^{th}$ frame, RealMAD$_{i,j}$ represents the real MAD of the j$^{th}$ MB of the i$^{th}$ frame, and PredMAD$_{i,j}$ represents the prediction MAD of the j$^{th}$ MB of the i$^{th}$ frame. Delta$_{i,j}$ may be stored in a volatile memory, so that it can be used to calculate an adjustment coefficient for the next MB of the i$^{th}$ frame (current frame) by the quantization parameter calculator 250 or 350 (as shown in step S430). In some embodiments, Equation (4) may be implemented in instructions, macrocode or microcode, and calculated when a processor loads and executes the instructions, macrocode or microcode. In alternative embodiments, Equation (4) may be implemented in dedicated hardware circuits. FIG. 8 is a schematic diagram illustrating hardware circuits for calculating an increment of the current MB of the current frame according to an embodiment of the invention. A subtractor 810 subtracts the prediction MAD PredMAD$_{i,j}$ of the current MB of the current frame from the real MAD RealMAD$_{i,j}$ of the current MB of the current frame and outputs a result to a multiplier 830. The multiplier 830 multiplies the output of the subtractor 810 by the adjustment coefficient $\alpha_{i,j}$ of the current MB of the current frame to obtain the increment $\text{Delta}_{i,j}$ of the current MB of the current frame.

Figure 9:
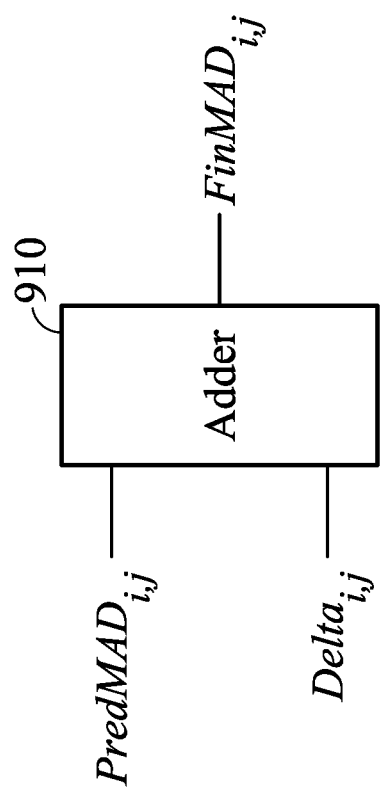
FIG. 9 is a schematic diagram illustrating hardware circuits for calculating a final MAD of the current MB of the current frame according to an embodiment of the invention.

Next, a final MAD of the current MB of the current frame is calculated according to the prediction MAD and the increment of the current MB of the current frame (step S450). In step S450, the final MAD of the current MB of the current frame may be calculated using Equation (5):

$$\text{FinMAD}_{i,j} = \text{PredMAD}_{i,j} + \text{Delta}_{i,j};$$

where $\text{FinMAD}_{i,j}$ represents the final MAD of the $j^{th}$ MB (the current MB) of the ith frame (the current frame), $\text{PredMAD}_{i,j}$ represents the prediction MAD of the $j^{th}$ MB of the ith frame, and $\text{Delta}_{i,j}$ represents the increment of the $j^{th}$ MB of the $i^{th}$ frame. In some embodiments, Equation (5) may be implemented in instructions, macrocode or microcode, and calculated when a processor loads and executes the instructions, macrocode or microcode. In alternative embodiments, Equation (5) may be implemented in dedicated hardware circuits. FIG. 9 is a schematic diagram illustrating hardware circuits for calculating a final MAD of the current MB of the current frame according to an embodiment of the invention. An adder 910 adds the increment $\text{Delta}_{i,j}$ of the current MB of the current frame to the prediction MAD $\text{PredMAD}_{i,j}$ of the current MB of the current frame to obtain the final MAD $\text{FinalMAD}_{i,j}$ of the current MB of the current frame.

Next, a quantization parameter of the current MB of the current frame is calculated at least according to the final MAD (step S460). In step S460, the quantization parameter of the current MB of the current frame may be calculated using Equation (6):

$$f(i,j) - m_h(i,j) = c_1 \times \frac{FinMAD_{i,j}}{Q_{i,j}} + c_2 \times \frac{FinMAD_{i,j}}{Q_{i,j}^2};$$

where $Q_{i,j}$ represents a quantization parameter of the $j^{th}$ MB (the current MB) of the $i^{th}$ frame (the current frame), $f(i,j)$ represents a stream budget of the $j^{th}$ MB of the $i^{th}$ frame, $m_h(i,j)$ represents a syntax element length of the $j^{th}$ MB of the $i^{th}$ frame, $c_1$ and $c_2$ represent parameters (default constants) of a quantization parameter prediction model and represents the final MAD $\text{FinalMAD}_{i,j}$ of the $j^{th}$ MB of the $i^{th}$ frame. In some embodiments, Equation (6) may be implemented in instructions, macrocode or microcode, and calculated when a processor loads and executes the instructions, macrocode or microcode.

Finally, the quantization parameter $Q_{i,j}$ of the current MB of the current frame is output to the quantizer 270, thereby enabling the quantizer 270 to quantize the current transformed MB of the current frame output from the transformer 230 accordingly (step S470).

Figure 10:
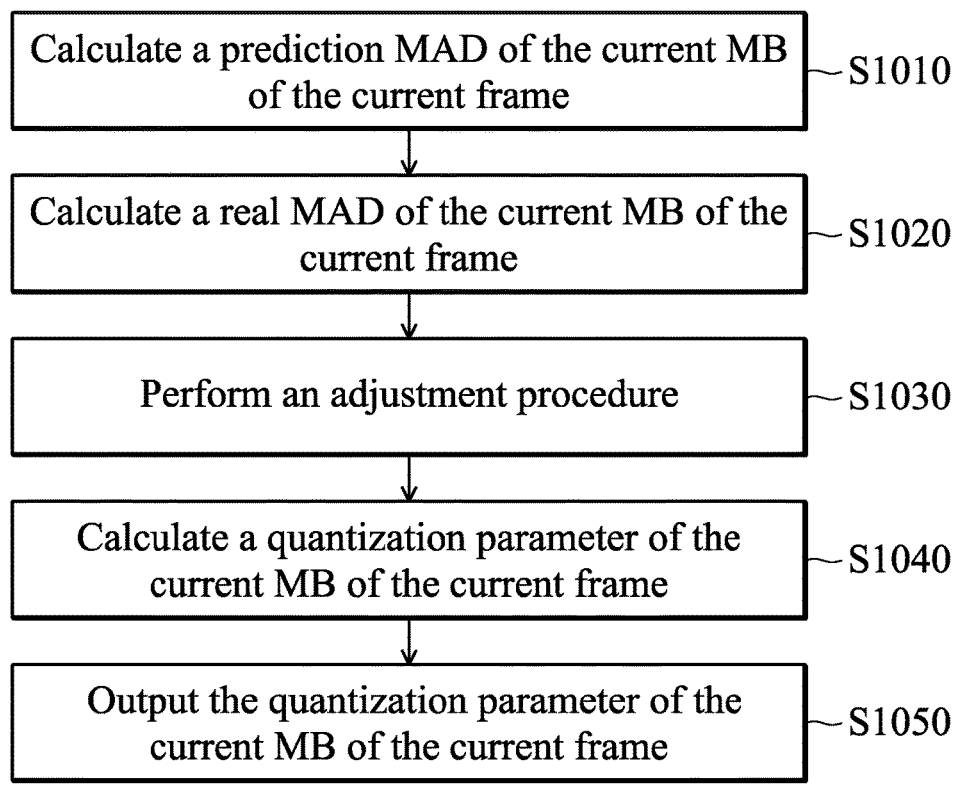
FIG. 10 is a flowchart illustrating a method for rate control in an MB layer according to an embodiment of the invention.

In an aspect of embodiments of the invention, a method for rate control in an MB layer includes an adjustment procedure to adjust a prediction MAD according to a real MAD for each MB of the current frame to make a final MAD closer to the reality. Therefore, the quantization parameter calculator 250 can improve the inaccuracy and latency of the prediction MAD under the linear prediction model when complexity variances within a video sequence are high. FIG. 10 is a flowchart illustrating a method for rate control in an MB layer according to an embodiment of the invention. The method may be implemented in the quantization parameter calculator 250 or 350 to provide the recited functionality. A prediction MAD $\text{PredMAD}_{i,j}$ of the current MB of the current frame is calculated (step S1010). A real MAD $\text{RealMAD}_{i,j}$ of the current MB of the current frame is calculated (step S1020). An adjustment procedure is performed to adjust the prediction MAD of the current MB of the current frame according to the real MAD of the current MB of the current frame to obtain a final MAD of the current MB of the current frame that is closer to reality (step S1030). A quantization parameter of the current MB of the current frame is calculated according to the final MAD of the current MB of the current frame (step S1040). The quantization parameter of the current MB of the current frame is output to the quantizer 270 or 370, thereby enabling the quantizer 270 or 370 and the entropy encoder 290 or 390 to generate a compressed video stream $V_{OUT}$ under a rate corresponding to the current MB of the current frame (step S1050). Calculation details of step S1010 are identical to the descriptions of step S420 and are omitted for brevity. Calculation details of step S1020 are identical to the descriptions of step S410 and are omitted for brevity. Calculation details of step S1030 are identical to the descriptions of steps S430 to S450 and are omitted for brevity. Calculation details of step S1040 are identical to the descriptions of step S460 and are omitted for brevity.

The adjustment coefficient $\alpha_{i,j}$ of the $j^{th}$ MB (the current MB) of the $i^{th}$ frame (the current frame) recited in step S430 represents the adjustment strength of the prediction MAD of the adjustment mechanism. When $\alpha_{i,j}$ is greater, the rate control needs to take more real MAD into account. Since a stream budget of a frame is determined in the beginning of the encoding, to make the sum of stream budgets of all MBs of the frame achieve the stream budget of the frame, $\alpha_{i,j}$ is used to suppress the trend of the adjustment strength departing from 0.

Although the embodiment has been described as having specific elements in FIGS. 2-3 and 6-9, it should be noted that additional elements may be included to achieve better performance without departing from the spirit of the invention. While the process flows described in FIGS. 4 and 10 include a number of operations that appear to occur in a specific order, it should be apparent that these processes can include more or fewer operations, which can be executed serially or in parallel (e.g., using parallel processors or a multi-threading environment).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for rate control in an MB (macroblock) layer, comprising:
   calculating a prediction MAD (Mean Absolute Difference) of a current MB of a current frame according to a real MAD of a previous MB of a previous frame, wherein the current MB and the previous MB are located at the same two-dimensional coordinates of the current frame and the previous frame, respectively, and the real MAD of the previous MB of the previous frame reflects the variances between raw data and reconstructed data of the previous MB;
   calculating a real MAD of the current MB of the current frame, wherein the real MAD of the current MB of the current frame reflects the variances between raw data and reconstructed data of the current MB;

performing an adjustment procedure to adjust the prediction MAD of the current MB of the current frame according to the real MAD of the current MB of the current frame to obtain a final MAD of the current MB of the current frame;

calculating a quantization parameter of the current MB of the current frame according to the final MAD of the current MB of the current frame; and outputting the quantization parameter of the current MB of the current frame to a quantizer, thereby enabling the quantizer to generate a compressed video stream under a rate corresponding to the current MB of the current frame.

2. The method of claim 1, wherein the prediction MAD of the current MB of the current frame is calculated using a linear prediction model.

3. The method of claim 2, wherein the prediction MAD of the current MB of the current frame is calculated using an Equation:

$$PredMAD_{i,j} = a_1 \times RealMAD_{i-1,j} + a_2;$$

$PredMAD_{i,j}$ represents the prediction MAD of the current MB of the current frame, $RealMAD_{i-1,j}$ represents the real MAD of the previous MB of the previous frame, and $a_1$ and $a_2$ are parameters of the linear prediction model.

4. The method of claim 3 wherein the parameters $a_1$ and $a_2$ are fit by generalized least squares according to historical data.

5. The method of claim 1, wherein the real MAD of the current MB of the current frame is calculated using an Equation:

$$RealMAD_{i,j} = \left(\sum_{m=0}^{M-1}\sum_{n=0}^{N-1} |CstPixel_{m,n} - OriPixel_{m,n}|\right) / (M \times N);$$

$RealMAD_{i,j}$ represents the real MAD of the current MB of the current frame, M represents a total number of rows of the current MB of the current frame, N represents a total number of columns of the current MB of the current frame, $PredPixel_{m,n}$ represents a prediction pixel of the $n^{th}$ column of the $m^{th}$ row of the current MB of the current frame, and $OriPixel_{m,n}$ represents a raw pixel of the $n^{th}$ column of the $m^{th}$ row of the current MB of the current frame.

6. The method of claim 1, wherein the adjustment procedure comprises:

calculating an adjustment coefficient of the current MB of the current frame according to the prediction and real MADs of the current MB of the current frame and accumulated deltas of all MBs before the current MB of the current frame;

calculating an increment of the current MB of the current frame according to the prediction and real MADs and the adjustment coefficient of the current MB of the current frame; and calculating the final MAD of the current MB of the current frame according to the prediction MAD and the increment of the current MB of the current frame.

7. The method of claim 6, wherein the adjustment coefficient is greater than 0 and is smaller than or equal to 1.

8. The method of claim 6, wherein the adjustment coefficient of the current MB of the current frame is calculated using an Equation:

$$\alpha_{i,j} = 2^{-2 \times abs\left(\sum_{k=0}^{j-1} Delta_{i,k} + RealMAD_{i,j} - PredMAD_{i,j}\right)};$$

$\alpha_{i,j}$ represents the adjustment coefficient of the current MB of the current frame, $$\sum_{k=0}^{j-1} Delta_{i,k}$$

represents the accumulated deltas from the $0^{th}$ MB to the $j-1^{th}$ MB of the current frame, $PredMAD_{i,j}$ represents the prediction MAD of the current MB of the current frame, $RealMAD_{i,j}$ represents the real MAD of the current MB of the current frame.

9. The method of claim 6, wherein the increment of the current MB of the current frame is calculated using an Equation:

$$Delta_{i,j} = \alpha_{i,j} \times (RealMAD_{i,j} - PredMAD_{i,j});$$

$Delta_{i,j}$ represents the increment of the current MB of the current frame, $\alpha_{i,j}$ represents the adjustment coefficient of the current MB of the current frame, $RealMAD_{i,j}$ represents the real MAD of the current MB of the current frame, and $PredMAD_{i,j}$ represents the prediction MAD of the current MB of the current frame.

10. The method of claim 6, wherein the final MAD of the current MB of the current frame is calculated using an Equation:

$$FinMAD_{i,j} = PredMAD_{i,j} + Delta_{i,j};$$

$FinMAD_{i,j}$ represents the final MAD of the current MB of the current frame, $PredMAD_{i,j}$ represents the prediction MAD of the current MB of the current frame, and $Delta_{i,j}$ represents the increment of the current MB of the current frame.

11. An apparatus for rate control in an MB (macroblock) layer, comprising:

a quantizer; and a quantization parameter calculator, coupled to the quantizer, calculating a prediction MAD (Mean Absolute Difference) of a current MB of a current frame according to a real MAD of a previous MB of a previous frame, wherein the current MB and the previous MB are located at the same two-dimensional coordinates of the current frame and the previous frame, respectively, and the real MAD of the previous MB of the previous frame reflects the variances between raw data and reconstructed data of the previous MB; calculating a real MAD of the current MB of the current frame, wherein the real MAD of the current MB of the current frame reflects the variances between raw data and reconstructed data of the current MB; performing an adjustment procedure to adjust the prediction MAD of the current MB of the current frame according to the real MAD of the current MB of the current frame to obtain a final MAD of the current MB of the current frame; calculating a quantization parameter of the current MB of the current frame according to the final MAD of the current MB of the current frame; and outputting the quantization parameter of the current MB of the current frame to a quantizer, thereby enabling the quantizer to generate a compressed video stream under a rate corresponding to the current MB of the current frame.

12. The apparatus of claim 11, wherein the prediction MAD of the current MB of the current frame is calculated using a linear prediction model.

13. The apparatus of claim 12, wherein the prediction MAD of the current MB of the current frame is calculated using an Equation:

$$\text{PredMAD}_{i,j} = a_1 \times \text{RealMAD}_{i-1,j} + a_2;$$

PredMAD$_{i,j}$ represents the prediction MAD of the current MB of the current frame, RealMAD$_{i,j}$ represents the real MAD of the previous MB of the previous frame, and $a_1$ and $a_2$ are parameters of the linear prediction model.

14. The apparatus of claim 13, wherein the parameters $a_1$ and $a_2$ are fit by generalized least squares according to historical data.

15. The apparatus of claim 11, wherein the real MAD of the current MB of the current frame is calculated using an Equation:

$$\text{RealMAD}_{i,j} = \left( \sum_{m=0}^{M-1} \sum_{n=0}^{N-1} |\text{CstPixel}_{m,n} - \text{OriPixel}_{m,n}| \right) / (M \times N);$$

RealMAD$_{i,j}$ represents the real MAD of the current MB of the current frame, M represents a total number of rows of the current MB of the current frame, N represents a total number of columns of the current MB of the current frame, PredPixel$_{m,n}$ represents a prediction pixel of the n$^{th}$ column of the m$^{th}$ row of the current MB of the current frame, and OriPixel$_{m,n}$ represents a raw pixel of the n$^{th}$ column of the m$^{th}$ row of the current MB of the current frame.

16. The apparatus of claim 11, wherein the adjustment procedure comprises:
calculating an adjustment coefficient of the current MB of the current frame according to the prediction and real MADs of the current MB of the current frame and accumulated deltas of all MBs before the current MB of the current frame;
calculating an increment of the current MB of the current frame according to the prediction and real MADs and the adjustment coefficient of the current MB of the current frame; and
calculating the final MAD of the current MB of the current frame according to the prediction MAD and the increment of the current MB of the current frame.

17. The apparatus of claim 16, wherein the adjustment coefficient is greater than 0 and is smaller than or equal to 1.

18. The apparatus of claim 16, wherein the adjustment coefficient of the current MB of the current frame is calculated using an Equation:

$$\alpha_{i,j} = 2^{-2 \times abs\left(\sum_{k=0}^{j-1} \text{Delta}_{i,k} + \text{RealMAD}_{i,j} - \text{PredMAD}_{i,j}\right)};$$

$\alpha_{i,j}$ represents the adjustment coefficient of the current MB of the current frame, $$\sum_{k=0}^{j-1} \text{Delta}_{i,k}$$

represents the accumulated deltas from the 0$^{th}$ MB to the j$-1^{th}$ MB of the current frame, PredMAD$_{i,j}$ represents the prediction MAD of the current MB of the current frame, RealMAD$_{i,j}$ represents the real MAD of the current MB of the current frame.

19. The apparatus of claim 16, wherein the increment of the current MB of the current frame is calculated using an Equation:

$$\text{Delta}_{i,j} = \alpha_{i,j} \times (\text{RealMAD}_{i,j} - \text{PredMAD}_{i,j});$$

Delta$_{i,j}$ represents the increment of the current MB of the current frame, $\alpha_{i,j}$ represents the adjustment coefficient of the current MB of the current frame, RealMAD$_{i,j}$ represents the real MAD of the current MB of the current frame, and PredMAD$_{i,j}$ represents the prediction MAD of the current MB of the current frame.

20. The apparatus of claim 16, wherein the final MAD of the current MB of the current frame is calculated using an Equation:

$$\text{FinMAD}_{i,j} = \text{PredMAD}_{i,j} + \text{Delta}_{i,j};$$

FinMAD$_{i,j}$ represents the final MAD of the current MB of the current frame, PredMAD$_{i,j}$ represents the prediction MAD of the current MB of the current frame, and Delta$_{i,j}$ represents the increment of the current MB of the current frame.

* * * * *